United States Patent [19] [11] Patent Number: 4,980,072
Augustin et al. [45] Date of Patent: Dec. 25, 1990

[54] PROCESS FOR THE REMOVAL OF SURFACE-DISTRIBUTED HYDROCARBONS, IN PARTICULAR OIL RESIDUES

[75] Inventors: Thomas Augustin; Dietmar Schäpel, both of Cologne; Peter Nowak, Dormagen, all of Fed. Rep. of Germany

[73] Assignee: Bayer Aktiengesellschaft, Leverkusen, Fed. Rep. of Germany

[21] Appl. No.: 430,206

[22] Filed: Nov. 1, 1989

[30] Foreign Application Priority Data

Nov. 24, 1988 [DE] Fed. Rep. of Germany ....... 3839570

[51] Int. Cl.$^5$ ................................................ C02F 1/56
[52] U.S. Cl. ..................................... 210/735; 210/747; 210/925; 134/42; 252/184
[58] Field of Search .............. 210/702, 708, 729, 732, 210/735, 747, 776, 922, 923, 925, 924, 734, 693; 405/60; 134/42; 252/184

[56] References Cited

U.S. PATENT DOCUMENTS

| 3,869,385 | 3/1975 | Stanley et al. | 210/925 X |
| 3,977,969 | 8/1976 | Zall | 210/40 |
| 4,039,489 | 8/1977 | Fletcher et al. | 210/924 X |

FOREIGN PATENT DOCUMENTS

| 471971 | 4/1976 | Australia. | |
| 2103217 | 4/1972 | France. | |
| 5147721 | 4/1971 | Japan | 210/925 X |
| 494675 | 5/1972 | Japan | 210/924 X |

OTHER PUBLICATIONS

Patent Abstracts of Japan, No. 3, (C-557), Mar. 3, 1987, (JP-A-63-215789).

*Primary Examiner*—Peter Hruskoci
*Assistant Examiner*—Krisanne Shideler
*Attorney, Agent, or Firm*—Sprung Horn Kramer & Woods

[57] ABSTRACT

Surface-distributed hydrocarbons, in particular mineral oil and mineral oil processing products, are removed by allowing water and a polyether containing isocyanate end groups to act on the hydrocarbons and by mechanically removing the gel containing hydrocarbons which is formed.

5 Claims, No Drawings

PROCESS FOR THE REMOVAL OF SURFACE-DISTRIBUTED HYDROCARBONS, IN PARTICULAR OIL RESIDUES

The present invention relates to a process for the removal of surface-distributed hydrocarbons, in which the hydrocarbons are converted into a gel which is subsequently removed mechanically.

In the handling of hydrocarbons, for example in transport, storage and processing of mineral oil, due to improper action or accidents it may occur that hydrocarbons are surface-distributed in an undesired manner, for example in the form of a film of oil on water. Some methods are already known for the removal of hydrocarbons of this type, which, however, all suffer from disadvantages.

The most widespread method is to take up surfacedistributed hydrocarbons using granulated or pulverulent porous absorbents (see SU-PS 922,079). Recommended absorbents of this type are, for example, polyurethanes, polystyrenes, phenol-formaldehyie resins, expanded perlite, vermiculite, pumice, wood shavings and sawdust. It is disadvantageous that, after taking up the oil, such absorbents show no coherent structure and therefore mechanical removal, for example from a water surface, is difficult.

According to another method, hydrocarbons distributed on a water surface are emulsified or dispersed. Due to the surface enlargement connected with this, the biological degradation of the oil should be accelerated (see Institute of Petroleum, Guidelines on the Use of Oil Spill Dispersants, London, 1986). This is a removal process requiring a long time, since hydrocarbons are only very slowly biologically degraded even when finely distributed and can still act on the environment for a long time. In addition, the auxiliaries required for emulsification and dispersion (surfactants and dispersants) and their degradation products may have undesired effects on the environment.

Finally, it is known to remove hydrocarbons from water surfaces by producing, from two components, an elastic material, which takes up the oil and which is then easy to remove from the water surface. According to EP-OS 23,084, the material is produced from polybutadiene or polyisoprene derivatives and a wetting agent, and according to US-PS 3,869,385, from an isocyanate and an amine. In this case, it is disadvantageous that two chemicals, which have to be mixed in a defined ratio, always have to be kept ready.

A process for the removal of surface-distributed hydrocarbons has now been found which is characterized in that water and a polyether having isocyanate end groups are allowed to act on the hydrocarbons and the gel containing the hydrocarbons which is removed mechanically.

In the context of the present invention, the term "hydrocarbons" is to be understood as meaning in particular mineral oil, mineral oil processing products, aliphatic and aromatic hydrocarbons, in each case having boiling points above 30° C. (at normal pressure), and mixtures which contain these substances, for example in amounts of 50% by weight or more.

Surface distribution means that hydrocarbons to be removed in the manner according to the invention are spread on the surface. They can be situated, for example, on water, earth, metal, stone, concrete, asphalt or other surfaces. Preferably, the hydrocarbons are distributed in such a way that the ratio of density of the layer to diameter of the layer is at most 0.1:1, preferably less than 0.05:1.

The process according to the invention can be used, in particular, for the removal of mineral oil and mineral oil processing products from water surfaces, the water being, for example, flowing or stagnant, natural or artificially established, stretches of inland or seawater.

It is an essential feature of the process according to the invention that a polyether containing isocyanate end groups is employed therein. Possible examples thereof are polyalkylene oxides having isocyanate end groups, which correspond to the formula (I)

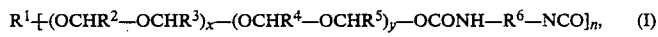

$$R^1 + (OCHR^2 - OCHR^3)_x - (OCHR^4 - OCHR^5)_y - OCONH - R^6 - NCO]_n \quad (I)$$

in which $R^1$ represents an alkyl radical having 3 to 18 C atoms, $R^2$, $R^3$, $R^4$ and $R^5$ are identical or different and each represent hydrogen or an alkyl radical having 1 to 20 C atoms, $R^6$ represents optionally substituted alkylene having 4 to 30 C atoms, cycloalkylene having 5 to 30 C atoms or arylene having 6 to 80 C atoms, x and y are identical or different and each represent a whole number from 5 to 200 and n represents one of the numbers 3, 4, 5 or 6.

In formula (I)

$R^1$ preferably represents an alkyl radical having 3 to 10 C atoms, $R^2$, $R^3$, $R^4$ and $R^5$ are identical or different and each preferably represent hydrogen or an alkyl radical having 1 to 12 C atoms, $R^6$ preferably represents alkylene having 4 to 20 C atoms optionally substituted with $C_1$-$C_4$-alkyl, isocyanate and/or chlorine groups, cycloalkylene having 5 to 20 C atoms or arylene having 6 to 20 C atoms or bi- or tricyclic cycloalkylene or arylene, in which the individual rings independently of one another each represent a cycloalkylene or arylene radical of this type and the individual rings are linked directly and/or via oxygen, CH, $CH_2$, $C(CH_3)_2$ and/or $C(CH_3)$ bridges, x and y are identical or different and each preferably represent a whole number from 8 to 50 and n preferably represents one of the numbers 3, 4 or 5.

In formula (I) $R^2$ and $R^4$ particularly preferably represent hydrogen and $R^3$ and $R^5$ hydrogen or methyl.

If $R^2$, $R^3$, $R^4$ and $R^5$ are not all identical, then it is possible, for example, that $R^2$ and $R^3$ are identical and $R^4$ and $R^5$ are identical with one another, but different from $R^2$ and $R^3$.

It is also possible, for example, that $R^2$ and $R^4$ are identical and $R^3$ and $R^5$ are identical with one another but different from $R^2$ and $R^4$. In one (OCHR$^2$—CHR$^3$)$_x$—, (OCHR$^4$—CHR$^5$)$_y$— or (OCHR$^2$-CHR$^3$)$_x$—(OCHR$^4$-CHR$^5$)$_y$ moiety of the formula (I), various radicals $R^2$ to $R^5$ can be randomly or regularly distributed.

According to the invention, possible polyalkylene oxides containing isocyanate end groups are also mixtures of various individual compounds of the formula (I). Similarly, in a molecule of the formula (I), the polyalkylene oxide chains containing isocyanate end groups bonded individually to $R^1$ can be variously constructed, for example with respect to the values of x and/or y and/or the meaning of $R^2$ to $R^5$.

Compounds of the formula (I) can be prepared, for example, by reacting an isocyanate of the formula (II)

$$OCN-R^6-NCO \qquad (II),$$

in which $R^6$ has the meaning indicated in formula (I), with a polyether of the formula (III)

$$R^1\text{+}(OCHR^2-CHR^3)_x-(OCHR^4-CHR^5)_y-OH]_n, \qquad (III)$$

in which $R^1$ to $R^5$, x, y and n have the meaning indicated in formula (I).

Examples of suitable isocyanates of the formula (II) are: hexamethylene diisocyanate, cyclohexane 1,4-diisocyanate, 2,4- and 2,6-toluylene diisocyanate and their mixtures, 1-isocyanatomethyl-5-ioscyanato-1,3,3-trimethylcyclohexane, 2,2,4- and 2,4,4-trimethylhexamethylene-1,6-diisocyanate, 1,5-naphthalenediisocyanate, 1,3-cyclopentylene diisocyanate, m- and p-phenylene diisocyanate, 2,4,6-toluylene triisocyanate, 4,4',4''-triphenylmethane triisocyanate, 1,3- and 1,4-xylylene diisocyanate, 3,3-dimethyl-4,4'-diphenylmethane diisocyanate, 4,4'-diphenylmethane diisocyanate, 3,3'-dimethylbiphenylene diisocyanate, 4,4'-biphenylene diisocyanate, durene diisocyanate, 1-phenoxy-2,4'phenylene diisocyanate, 1-tert.-butyl-2,4-phenylene diisocyanate, methylene bis-4,4'-cyclohexyl diisocyanate, 1-chloro-2,4-phenylene diisocyanate and 4,4'-diphenyl ether diisocyanate.

It is furthermore possible to employ high molecular weight and also highly functionalized polyisocyanates which can be prepared from low molecular weight basic materials by polymerization reactions to give uretdions or isocyanurate derivatives, for example the uretdion from 2 moles of 2,4-toluylene diisocyanate, the isocyanurate ring-containing polymerization products from 2,4- and 2,6-toluylene diisocyanate and hexamethylene diisocyanate, a system containing an average of two isocyanurate rings in the molecule and formed from 5 moles of toluylene diisocyanate or a corresponding derivative from, on average, 2 moles of toluylene diisocyanate and 3 moles of hexamethylene diisocyanate.

It is also possible to prepare higher, biuretlinked systems from di- or polyisocyanates by partial hydrolysis via the carbamic acid and amine step, for example a biuret-linked compound, which formally is formed from 3 moles of hexamethylene diisocyanate with the addition of 1 mole of water and elimination of 1 mole of carbon dioxide, and to employ these as isocyanates of the formula (II). Suitable products are in particular obtained if the molar ratio of hydroxy compounds to the isocyanate is chosen so that free NCO groups always remain present in the randomly formed reaction products and a molecular weight of 2,000 to 10,000 is maintained.

Preferred isocyanates of the formula (II) employed are diisocyanates, in particular hexamethylene diisocyanate, isophorone diisocyanate, toluylene diisocyanate and diphenyl methane diisocyanate.

Polyethers of the formula (III) can be obtained, for example, by reacting a polyhydric alcohol of the formula (IV)

$$R^2-(OH)_n \qquad (IV),$$

in which $R^1$ and n have the meaning indicated in formula (I), with alkylene oxides of the formulae (V) and (VI)

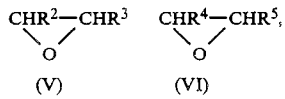

in which $R^2$, $R^3$, $R^4$ and $R^5$ have the meaning indicated in formula (I).

Preferred polyhydric alcohols of the formula (IV) are those based on propanes, butanes, pentanes and hexanes which contain at least 3 OH groups. Glycercol, pentaerythritol and trimethylolpropane are particularly preferred.

Preferred alkylene oxides of the formula (V) and (VI) are ethylene oxide, propylene oxide, 1,2- and 2,3-epoxybutane, dodecyl oxide, stearyl oxide and any mixtures thereof. Ethylene oxide and propylene oxide and mixtures of ethylene oxide and propylene oxide are particularly preferred. If more than one alkylene oxide is employed, two or more alkylene oxides can be employed at the same time or successively. Depending on this, variously constructed polyether chains are formed.

In the reaction of the alcohols of the formula (IV) with the alkylene oxides of the formulae (V) and (VI), block polymers, polymers having random distribution (so-called copolymers) or mixed forms of these polymer species may result. Preferably, the alcohols of the formula (IV) are reacted first with propylene oxide or an alkylene oxide mixture containing over 50% by weight of propylene oxide and then with ethylene oxide. Here, it is furthermore preferred to employ a mixture of ethylene oxide and propylene oxide in the first step, which mixture contains up to 99% by weight of the total ethylene oxide to be employed, and the residual alkylene oxide in the second step.

Preferred polyethers of the formula (III) contain 30 to 80% by weight of $O-CH_2-CH_2$ groups, particularly preferably 45 to 55% by weight of $O-CH_2-CH_2$ and 55 to 45% by weight of $O-CH_2-CH(CH_3)$ groups, the sum of these two components giving 100% by weight. Furthermore, polyethers of the formula (III) having molecular weights of 600 to 10,000 are preferred, in particular those having molecular weights of 700 to 5,000.

In the reaction of the polyether of the formula (III) with the polyisocyanate of the formula (II), the polyisocyanate is advantageously introduced initially and the polyether added. In order to prepare reproducible products, it is advantageous if the polyether is employed in anhydrous form. The reaction can be carried out in inert solvents such as benzene, toluene, xylene, chlorobenzene, o-dichlorobenzene, acetone or ethyl acetate, but also without solvent. Preferably, it is carried out in the temperature range between 0° and 140° C. and with the addition of catalysts customary in the preparation of urethanes (see, for example, Houben-Weyl, Methoden der organischen Chemie (Methods of Organic Chemistry), volume 14.2, page 61 (1963)), i.e. for example bases and tertiary bases such as pyridine, methylpyridine, N,N'-dimethylpiperazine, N,N-dimethylbenzylamine or N,N'-endoethylenepiperazine.

The formula (I) is an idealized structure. Depending on the reactivity of the reactants of the formulae (II)

and (III), the formation of polymer mixtures may result. If, however, diisocyanates of the formula (II) containing isocyanate groups of different reactivity are employed, for example 2,4-toluylene diisocyanate or isophorone diisocyanate, it is possible in the reaction with the polyethers of the formula (III) to react only the more reactive isocyanate group of the molecule in high yields first. The formation of a reaction product from 2 moles of polyether and 1 mole of diisocyanate in addition to 1 mole of free diisocyanate which is possible as a side reaction can be substantially suppressed by gentle reaction conditions, so that compounds of the formula (I) can be obtained in good to very good yields in the reaction.

The removal of surface-distributed hydrocarbons according to the invention can be performed by mixing the polyethers containing isocyanate end groups with water and allowing them to act on the hydrocarbons. The water can be, for example, salt water, fresh water or process water. Suitable amounts of water are, for example, those containing isocyanate end groups. This mixing can be performed, for example, in such a way that the polyether containing isocyanate end groups/water mixture is allowed to act on the hydrocarbons to be removed by means of a jet of water or an atomizing system. If hydrocarbons which are to be removed are present on water surfaces, premixing of polyethers containing isocyanate end groups with water can possibly be dispensed with, but it is then advantageous to move the polyether containing isocyanate end groups on the water surface.

The formation of gel from the polyether containing isocyanate end groups with water and the hydrocarbon to be removed is in general concluded to such an extent after a few minutes, for example 2 to 15 minutes, that the gel together with the hydrocarbon contained therein can then be removed by, for example, lifting off the gel formed. It may be advantageous during the gel formation to provide for mixing of the gel formed with the hydrocarbon.

The process according to the invention has a number of advantages: a coherent gel is formed, in which the hydrocarbons to be removed are contained, which can be removed in a simple manner. In the preparation and the use according to the invention of the polyethers containing isocyanate end groups, no solvents are required and no foreign substances pass into the environment. Hydrocarbons can be removed according to the invention in a short time. Since water frequently is accessible without problems and does not need to be used for the process according to the invention in accurately metered form, it is only necessary to keep one component ready (the polyether containing isocyanate end groups). A special metering device does not have to be available.

EXAMPLES

Example A (preparation of a polyether containing isocyanate end groups)

159 parts by weight of toluylene diisocyanate (80% by weight of 2,4- and 20% by weight of 2,6-isomer) were heated to 80° C in a reaction vessel. 1,200 parts by with stirring in the course of 3 hours. This polyether had been obtained by addition of ethylene oxide and propylene oxide to glycerol, first 98% by weight of the alkylene oxides in the form of a mixture of 60% by weight of ethylene oxide and 40% by weight of propylene oxide and then 2% by weight of the alkylene oxides in the form of pure propylene oxide being added, resulting in a polyether having a hydroxyl number of 28. The reaction mixture was stirred for a further hour at 80° C. The mixture was then cooled to room temperature with stirring. The product obtained had an isocyanate content of 4.2% by weight and a viscosity of 5,200 centipoises at 25° C.

Example 1:

3 g of the product from Example A were intensively mixed with 100 g of seawater (3.5% by weight salt content) for 25 seconds. This mixture was then added to a seawater surface which was covered wi(h 85 g of a North German crude oil (covered surface 0,028 $m^2$). A flow was then produced on the surface by means of a centrifugal pump (flow rate 10 m/min). After 10 minutes, a coherent polymer/oil blanket was removed by lifting off. This contained 99% of the crude oil.

Example 2:

3 g of the product from Example A were intensively mixed with 100 g of seawater (3.5% by weight salt content) for 25 seconds. This mixture was then added to a seawater surface which was covered with 85 g of a North German crude oil (covered surface 0,028 $m^2$). A slight flow was produced on the surface by means of a centrifugal pump (flow rate i m;min). After 10 minutes, a coherent polymer/oil blanket was removed by lifting off. This contained 98% of the crude oil employed.

Example 3:

3 g of the product from Example A were intensively mixed with 100 g of seawater (3.5% by weight salt content) for 25 seconds. This mixture was added to a seawater surface which was covered with 85 g of Iranian crude oil (covered surface 0,028 $m^2$). A slight flow was produced on the surface by means of a centrifugal pump (flow rate 1 m;min). After 10 minutes, a coherent polymer/oil blanket was removed by lifting off. This contained 91% of the crude oil employed.

Example 4:

3 g of the product from Example A were intensively mixed with 100 g of seawater (B.5% by weight salt content) for 2S seconds. This mixture was then added to a seawater surface which was covered with 85 g of heavy Iranian crude oil (covered surface O,028 $m^2$). A slight flow was then produced on the surface by means of a centrifugal pump (flow rate 1 m;min). After 10 minutes, a coherent polymer/oil blanket was removed by lifting off. This contained 98% of the crude oil employed.

Example 5:

3 g of the product from Example A were intensively mixed with 100 g of seawater (3.5% by weight salt content) for 25 seconds. This mixture was then added to a seawater surface which was covered with 76 g of petroleum (covered surface 0,028 $m^2$). A slight flow was produced on the surface by means of a centrifugal pump (flow rate 1 min). After 10 minutes, a coherent polymer/petroleum blanket was removed by lifting off. This contained 89.5% of the petroleum employed.

Example 6:

3 g of the product from Example A were intensively mixed with 100 g of seawater (3.5% by weight salt content) for 25 seconds. This mixture was added to a seawater surface which was covered with 87 g of toluene (covered surface 0,028 m²). A slight flow was then produced on the surface by means of a centrifugal pump (flow rate 1 m/min.). After 10 minutes, a coherent polymer/oil blanket was removed by lifting off. This contained 68% of the toluene previously employed.

Example 7:

3 g of the product from Example A were intensively mixed with 100 g of seawater (3.5% by weight salt content) for 25 seconds. This mixture was then added to a seawater surface which was covered with 92 g of heavy type S heating oil (covered surface 0,028 m²). A slight flow was then produced on the surface by means of a centrifugal pump (flow rate 1 m/min.). After 10 minutes, a coherent polymer/oil blanket was removed by lifting off. This contained 93% of the heating oil previously employed.

Example 8:

9 g of the product from Example A were intensively mixed with 100 g of a saturated calcium carbonate solution (0.15 g of calcium carbonate/100 ml of water) for 25 seconds. 100 g of type S heating oil were spread on an area of 0.03 m² of a concrete surface. The previously prepared mixture was then added to this heating oil surface and manually mixed for 3 minutes. After a waiting time of 10 minutes, a coherent polymer/oil carpet was removed by lifting off. This contained 94% of the heating oil previously employed.

Example 9:

9 g of the product from Example A were intensively mixed for 25 seconds with 100 g of tap water. 100 g of North German crude oil were then spread on an area of 0.03 m² of a concrete surface. The previously prepared mixture was then added to this crude oil surface and manually mixed for 3 minutes. After a waiting time of 10 minutes, a coherent polymer/crude oil carpet was removed by lifting off. This contained 90% of the crude oil employed.

What is claimed is:

1. A process for the removal of hydrocarbons spread on a surface, in which water and a polyether containing isocyanate end groups are added to the hydrocarbons and form a gel containing the hydrocarbons which is removed mechanically, in which the polyether containing isocyanate end groups is a polyalkylene oxide of the formula (I)

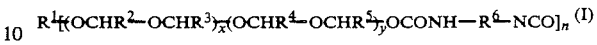

in which
- $R^1$ represents an alkyl radical having 3 to 18 C atoms,
- $R^2$, $R^3$, $R^4$ and $R^5$ are identical or different and each represent hydrogen or an alkyl radical having 1 to 20 C atoms,
- $R^6$ represents optionally substituted alkylene having 4 to 30 C atoms, cycloaklylene having 5 to 30 C atoms or arylene having 6 to 30 C atoms,
- x and y are identical or different and each represent a whole number from 5 to 200 and
- n represents one of the numbers 3, 4, 5 or 6.

2. The process of claim 1, in which in formula (I)
- $R^1$ represents an alkyl radical having 3 to 10 C atoms,
- $R^2$, $R^3$, $R^4$, and $R^5$ are identical or different and each represents hydrogen or an alkyl radical having 1 to 12 C atoms,
- $R^6$ represents alkylene having 4 to 20 C atoms optionally substituted with $C_1$-$C_4$-alkyl, isocyanate and/or chlorine groups, cycloalkylene having 5 to 20 C atoms or arylene having 6 to 20 C atoms or bi- or tricyclic cycloalkylene or arylene, in which the individual rings independently of one another each represent a cycloalkylene or arylene radical of this type and the individual rings are linked directly and/or via oxygen, CH, $CH_2$, $C(CH_3)_2$ and/or $C(CH_3)$ bridges,
- x and y are identical or different and each represents a whole number from 8 to 50 and
- n represents one of the numbers 3, 4 or 5.

3. The process of claim 1, in which the polyether containing isocyanate end groups is mixed with water and allowed to act on the hydrocarbons.

4. The process of claim 3, in which the mixture contains 80 to 98% by weight of water, relative to the polyether containing isocyanate end groups.

5. The process of claim 1, in which the gel formed is removed after 2 to 15 minutes.

* * * * *